Figures 1, 2:
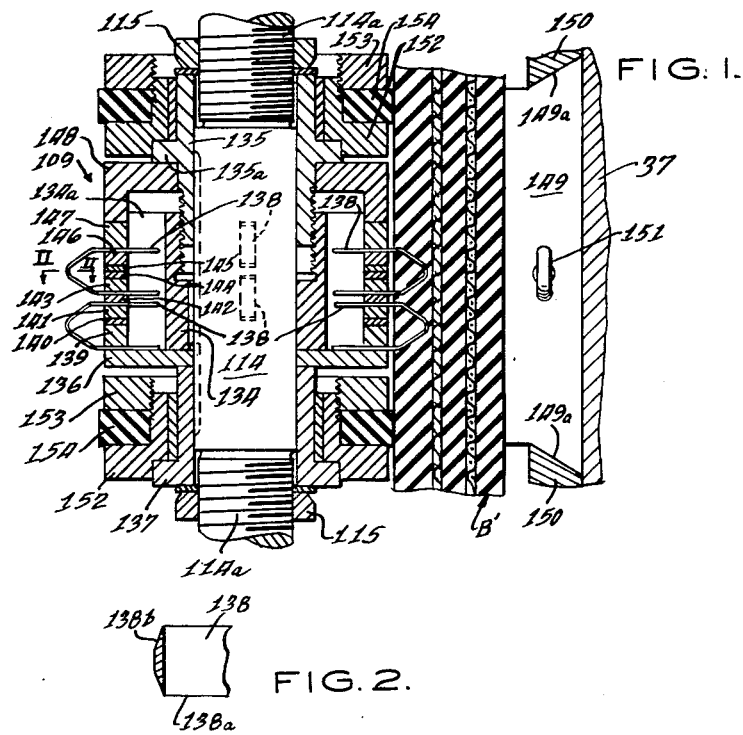

Nov. 23, 1965

G. C. GILBERT ETAL 3,218,895

TOOL FOR A MACHINING DEVICE

Original Filed April 13, 1962

INVENTORS
Gilbert C. Gilbert
BY Jack A. Willcox

ATTORNEYS

United States Patent Office 3,218,895
Patented Nov. 23, 1965

3,218,895
TOOL FOR A MACHINING DEVICE
Gilbert C. Gilbert, Beloit, Wis., and Jack A. Willcox, Rockford, Ill., assignors to Beloit Corporation, Beloit, Wis., a corporation of Wisconsin
Original application Apr. 13, 1962, Ser. No. 187,376. Divided and this application May 29, 1963, Ser. No. 284,136
3 Claims. (Cl. 83—5)

This invention relates generally to a grooving cutter, and more specifically to a knife constructed to groove rubber.

This application is a divisional application of our application filed April 13, 1962, U.S. Serial No. 187,376, and entitled "Method and Apparatus for Machining Belts and Article Produced Thereby."

Although the principles of the present invention may be included in various devices or tools, a particularly useful application is made in the provision of a grooving means for grooving large rubber objects, such as massive rubber belts. In particular, suction boxes of paper making machinery employ such a belt, and by way of illustration, such a belt may have a width of twenty-five feet, a length of thirty-five feet, and a mass so great that the same can best be handled by a crane during installation, removal, and handling thereof. A belt of this type is typically employed between the Fourdrinier wire and the suction box of a paper making machine, and to that end is provided with perforations and elongated grooves directed toward the Fourdrinier wire. It is therefore necessary to provide such grooves, and in a belt of this size, many thousands of grooves are required.

Attempts have previously been made to machine rubber belts by employing milling or grinding techniques. However, such techniques produce rubber dust, thereby creating fire and explosion hazards which have necessitated performance of the machining under water.

Accordingly, it is an object of this invention to provide a cutter for machining a massive rubber belt without use of milling or grinding of rubber, and without performing any machining under water, and yet avoiding fire and explosion hazards.

A further object of this invention is to provide a rubber cutter which may be moved through such a belt at a relatively high speed in a precision manner.

Yet another object of the present invention is to provide a cold grooving cutter which will effect a smooth cut in rubber.

A still further object of the present invention is to provide a cutter for rubber which may be rapidly handled or moved through rubber without the same being susceptible to breakage or excessive dulling.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIGURE 1 is a cross-sectional view of a cutter head assembly provided in accordance with the principles of the present invention, the same being illustrated in conjunction with a belt being grooved thereby; and FIGURE 2 is a fragmentary enlarged view taken along line II—II of FIGURE 1.

As shown on the drawings:

The principles of this invention are particularly useful when embodied in a rubber grooving knife or cutter such as illustrated in FIGURE 1, generally indicated by the numeral 138.

A portion B' of a belt is illustrated in FIGURE 1 as being backed up by a backup beam 37 while being machined. The machining is accomplished by a grooving head assembly which includes a cutter support generally indicated at 109 disposed adjacent to the belt portion B', the cutter support 109 being movable incrementally about a vertical axis, its position being further adjustable vertically, and horizontally, both parallel to and perpendicularly to a line perpendicular to the drawing by means shown in the above-identified application.

The cutter support 109 includes or is carried on a rotatable shaft 114 which is rotatably supported. The shaft 114 is threaded at two central portions thereof indicated at 114a, 114a which carry coacting nuts 115, 115 which jointly support the cutter assembly therebetween in a vertically adjustable position. In operation, the shaft 114 is positioned, moved, and locked as may be desired to effect the desired machining.

The cutter support or assembly 109 includes an annular body 134 slidably disposed on and keyed to the shaft 114. The annular body 134 includes a number of axially directed slots 134a, and a group of internal threads. These threads engage with corresponding threads in a sleeve nut 135, the nut 135 having a flange 135a. At the opposite end of the annular body 134, there is a clamping ring 136 and a sleeve 137. The sleeve nut 135 and the sleeve 137 are disposed between washers and are held on the shaft 114 by the nuts 115, as explained above. Between the flange 135a and the clamping ring 136, there is disposed a number of additional clamping rings and spacers which extend about the annular body 134. Tightening of the sleeve nut 135 effects axial clamping of all such additional clamping rings and spacers.

The cutter assembly 109 includes a number of cutters, the illustrated embodiment having eight separate cutters. Each cutter or cutter blade or knife blade in this embodiment is identical to the others, the cutter blade 138 therefore being typical. The cutter blade 138 initially comprises a length of tool steel approximately three-sixteenths to one-fourth inch in width, and approximately .020 inch in initial thickness. The cutter blade material is formed in a U-shape such as shown in FIGURE 1. The legs of the U-shape are clamped between suitably spaced clamping rings and also extend radially inwardly into one of the slots 134a in the annular body 134.

FIGURE 2 illustrates the preferred mode of sharpening. The cross-section illustrated in FIGURE 2 is that which is provided for substantially the entire portion of a U-shape which extends outwardly of the various clamping rings. Approximately one-third of the width of the blade 138 is ground away from each edge on the outer surface, the blade thickness being greatly exaggerated in FIGURE 2 for clarity of illustration. The material is so removed that opposite edges of the blade 138 comprise knife or cutting edges, such edges being substantially coplanar with the inner surface of the U-shape. When one edge 138a comprises the leading edge passing through rubber, there is provided a trailing recess 138b on the outside of the cutter which has an extent from the cutting edge which, as shown in FIG. 2, is about one-third or is between 25 and 50% of the length of the cutter in its cutting direction. The recess 138b combined with the internally disposed cutting edge 138a comprises a structure which may be utilized at room temperature for cutting rubber at room temperature, the resulting cut being one that is produced without galling and one that is exceptionally smooth to the touch. We have found that when a cutter structure 138 is employed of the type described and shown herein, the chip of rubber removed remains intact as a single piece which, as it passes through the cutter 138 as shown in the right-hand portion of FIGURE 1, usually stays in the groove, but is readily removed therefrom as by pushing. Each groove may be elongated, such as about two feet in length, and has an internal profile corresponding to the cutter 138. In a belt where thousands of such grooves are required, expeditious production of the same becomes quite urgent. Accordingly, the knives 138 are preferably ground at both edges for grooving in either direction, there being one such pair of knives sunk in the rubber simultaneously. Further, there is a second pair of such knives supported 90 rotational degrees from the first pair, such pairs being axially offset with respect to each other by one-half groove width. Where eight knives are used as shown, the interval between sharpening times is doubled.

All the legs of all the knives 138 are received in one of the slots 134a of the annular body 134. The lower legs of the lower knives of the lower pairs of knives are received between the clamping ring 136 and a clamping ring 139. The lower legs of the lower knives of the uppesr pairs of knives are reecived between the clamping ring 139 and a spacer 140. The upper legs of the lower knives of the lower pairs of knives are received between a pair of clamping rings 141 and 142. The lower legs of the upper knives of the lower pairs of knives are received between the clamping ring 142 and a clamping ring 143. The upper legs of the lower knives of the upper pair of knives are received between the clamping ring 143 and a spacer 144. The lower legs of the upper knives of the upper pair of knives are received between the spacer 144 and a spacer 145. The upper legs of the upper knives of the lower pair of knives are received between a pair of clamping rings 146 and 147. The upper legs of the upper knives of the upper pairs of knives are received between the clamping ring 147 and a clamping ring 148. By the omission of selected spacers or clamping rings, the knives 138 will be relocated so as to differently space the grooves and/or to provide them with a different profile. The axially offset knives, shown in broken lines, are employed to produce grooves offset from those being made by the cutters shown as being sunk in the rubber belt B'. The offset grooves can be made without shifting the shaft 114 axially, and without shifting the belt in a corresponding direction. Such a belt is illustrated in the application of which the present application is a division. By rotation of the cutter head assembly 109 for about 45°, rounded ends are provided in the grooves produced. By relative movement between the belt and the cutter head 109 without cutter rotation, elongated grooves are provided.

During machining of the belt portion B', it is supported by the backup member 37. The inner or rear face of the belt portion B' is engaged by a rubber platten 149 to support the same. The rubber platten 149 includes integral dovetail portions 149a which are slidably received between dovetail defining means 150 carried on the backup beam 37. The rubber platten 149 preferably is slightly harder than the belt, and has a portion that projects from the dovetails 149a, 150 to engage the belt. An eyelet 151 is provided on each end of the platten 149 for moving the platten. The platten 149 in this figure has not been drawn to scale.

To insure that the belt is disposed squarely against the rubber platten 149 and is seated firmly thereagainst, means are provided adjacent to the cutters 138 to insure that the belt is properly seated. To this end, the outer surface of the sleeve nut 135 rotatably supports an annular member 152 which has threaded engagement with an annular clamping member 153, and between which members 152 and 153 there is disposed an extrudible friction ring 154, as of rubber. By suitable positioning of the member 153 with respect to the member 152, the ring 154 is radially extruded by a selected amount so as to engage the outer surface of the belt B'. Similar members are also supported by the outer surface of the sleeve 137 at a point below the knives 138.

Although various minor modifications might be suggested by those versed in the art, it should be understood that we wish to embody within the scope of the patent warranted hereon all such embodiments as reasonably and properly come within the scope of our contribution to the art.

We claim as our invention:

1. A device for grooving rubber smoothly, where both the rubber and the knife are substantially at room temperature, comprising:
   (a) a shaft having an axis, said shaft being supported to be rotated about its axis and to be translated alternately during a grooving operation;
   (b) a U-shaped blade having a sharp cutting edge extending about an opening, said cutting edge having a surface coplanar with the inner surface of the U-shape;
   (c) means on said shaft so supporting said blade at the ends of the U-shape that said blade projects radially from the rotational axis of said shaft, and that the opening in the U-shape extends at all times in a direction transverse to the axis of the shaft, by which said cutting edge may be moved by said shaft substantially in the direction of said opening during a cutting operation; and
   (d) means on the outer surface of said blade defining a cutback portion on the marginal portion which trails said cutting edge, said cutback portion extending from the trailing edge of said blade and toward said cutting edge for a distance which is at least 25% of the length of said blade between said edges.

2. A device for grooving rubber smoothly, where both the rubber and the knife are substantially at room temperature, comprising:
   (a) a rotatable shaft having a rotational axis;
   (b) a pair of U-shaped blades each having a sharp cutting edge extending about an opening, each of said cutting edges having a surface coplanar with the inner surface of the U-shape;
   (c) means on said shaft so supporting said blades at the ends of the U-shapes that said blades project radially from said shaft, and that the openings in the U-shapes extend at all times in a direction transverse to the axis of the shaft, by which the cutting edge of one of said blades may be moved by said shaft substantially in the direction of its opening during a cutting operation, said means so supporting said blades that one of said blades is offset from the other of said blades both in an axial and in an angular direction therefrom; and
   (d) each of said blades having means on the outer surface thereof defining a cutback portion on the marginal portion thereof which trails its cutting edge, the cutback portion extending from the trailing edge of each blade and toward its cutting edge for a distance which is at least 25% of the distance between said edges.

3. A device for grooving rubber smoothly, where both the rubber and the knife are substantially at room temperature, comprising:
   (a) a shaft having an axis, said shaft being supported to be rotated about its axis and to be translated alternately during a grooving operation;
   (b) a U-shaped blade having oppositely directed sharp cutting edges with a common surface coplanar with the inner surface of the U-shape;
   (c) means on said shaft so supporting said blade at the ends of the U-shape that said blade projects radially from the rotational axis of said shaft, and that the opening in the U-shape extends at all times in a direction transverse to the axis of the shaft, by which said cutting edges may be moved by said shaft substantially in the direction of said opening during a cutting operation; and (d) a pair of means on the outer surface of said blade defining a pair of cutback portions on the marginal portions which respectively trail said cutting edges, said cutback portions respectively extending from the trailing edges of said blade and toward said cutting edges for a distance which is at least 25% of the length of said blade between said edges.

References Cited by the Examiner

UNITED STATES PATENTS

| | | |
|---|---|---|
| 1,404,118 | 1/1922 | Hargraves. |
| 1,616,087 | 2/1927 | Johnson _____ 30—280 |
| 1,955,395 | 4/1934 | Tueth _____ 83—171 |
| 2,097,811 | 11/1937 | Foley _____ 30—280 |
| 2,157,151 | 5/1939 | Stackhouse _____ 83—171 |
| 2,362,967 | 11/1944 | Bivans. |

ANDREW R. JUHASZ, *Primary Examiner.*